United States Patent
Tziortzis et al.

(10) Patent No.: US 8,587,539 B2
(45) Date of Patent: Nov. 19, 2013

(54) MULTI-BEND DISPLAY ACTIVATION ADAPTATION

(75) Inventors: Alek Tziortzis, Rolling Meadows, IL (US); Bashar Jano, Rolling Meadows, IL (US)

(73) Assignee: BlackBerry Limited, Waterloo Ontario (CA)

(*) Notice: Subject to any disclaimer, the term of this patent is extended or adjusted under 35 U.S.C. 154(b) by 323 days.

(21) Appl. No.: 13/011,274

(22) Filed: Jan. 21, 2011

(65) Prior Publication Data

US 2012/0188153 A1 Jul. 26, 2012

(51) Int. Cl.
G09G 5/00 (2006.01)
G09G 5/08 (2006.01)
G06F 3/041 (2006.01)
G06F 1/16 (2006.01)

(52) U.S. Cl.
USPC ......... 345/173; 345/63; 345/156; 361/679.05

(58) Field of Classification Search
USPC ........... 345/76, 107, 156, 173, 659, 661, 905, 345/63; 715/716, 776, 777, 808, 815, 840; 178/18.03; 455/566; 361/679.05, 361/679.15, 679.16
See application file for complete search history.

(56) References Cited

U.S. PATENT DOCUMENTS

| | | | |
|---|---|---|---|
| 7,081,888 B2 | 7/2006 | Cok et al. | |
| 7,714,801 B2 | 5/2010 | Kimmel | |
| 2004/0052037 A1* | 3/2004 | Sawyer | 361/681 |
| 2006/0256074 A1 | 11/2006 | Krum et al. | |
| 2006/0274042 A1* | 12/2006 | Krah et al. | 345/163 |
| 2007/0247422 A1* | 10/2007 | Vertegaal et al. | 345/156 |
| 2008/0180399 A1 | 7/2008 | Cheng | |
| 2008/0303782 A1 | 12/2008 | Grant et al. | |
| 2009/0096746 A1 | 4/2009 | Kruse et al. | |
| 2010/0011291 A1 | 1/2010 | Nurmi | |
| 2010/0033435 A1 | 2/2010 | Huitema | |
| 2010/0045705 A1 | 2/2010 | Vertegaal et al. | |
| 2010/0053074 A1 | 3/2010 | Cohen et al. | |
| 2010/0117975 A1* | 5/2010 | Cho | 345/173 |

FOREIGN PATENT DOCUMENTS

| | | |
|---|---|---|
| WO | WO2009144363 | 12/2009 |
| WO | WO2010041227 | 4/2010 |

OTHER PUBLICATIONS

European Search Report dated May 24, 2011 for EP11151741.
Examiner's Report dated Mar. 4, 2013 for European Patent Application No. 11151741.3.

* cited by examiner

*Primary Examiner* — Quan-Zhen Wang
*Assistant Examiner* — Michael J Eurice
(74) *Attorney, Agent, or Firm* — Jeffrey N. Giunta; Fleit Gibbons Gutman Bongini & Bianco PL

(57) ABSTRACT

Systems and methods determine likely unintended flexing of a flexible display and exclude the determined unintended flexings from user input processing. Unintended flexings include placing or removing the flexible display into or out of a compact storage configuration, folds that outside the user's visible area, folds that are near edges and boundaries, flexing with a specified degree of bending or orientation, folds that don't intersect with other folds, folds that are near known unintended folds, folds that have a motion or other variation with time, and folds that are not in proximity to a selectable user interface element. Unintended flexings are adaptively identified by determining that a bend that is not in proximity to a selectable user interface element reoccurs at times when icons at different locations are presented on the flexible display.

27 Claims, 8 Drawing Sheets

US 8,587,539 B2

MULTI-BEND DISPLAY ACTIVATION ADAPTATION

FIELD OF THE DISCLOSURE

The present disclosure generally relates to flexible electronic displays and more particularly to adapting the sensing of flexing of flexible electronic displays to enhance proper user input detection.

BACKGROUND

Flexible or bendable electronic displays provide a user with many techniques for interacting with electronic devices. For example, users are able to provide input to an electronic device based upon flexing, such as by bending, folding, or bending and folding, the flexible display. Flexible displays are also able to be flexed due to intended flexing by a user or by unintended flexing due to other forces on the flexible display. Distinguishing flexings of a flexible display that are intended to indicate a user's input from unintended flexings often limits the design of flexible displays or includes additional user steps beyond simply flexing the display to provide an input to an electronic device.

Therefore, flexible displays are limited by current techniques used to prevent inadvertent activations of functions by unintentional flexing of the flexible display.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
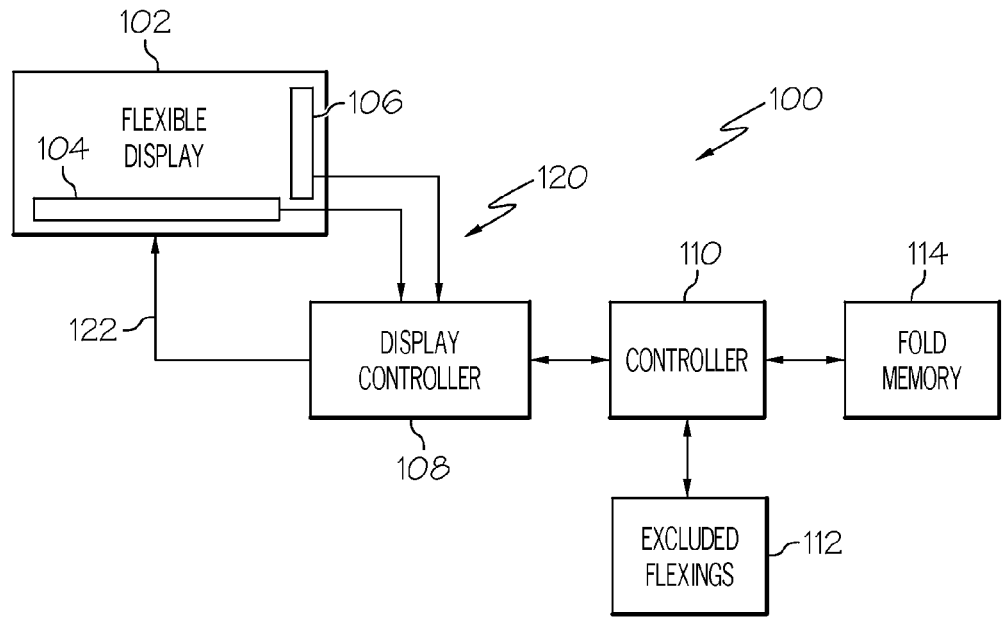
FIG. 1 is a block diagram of an electronic device in accordance with one example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

Described below are systems and methods that process data from sensors of a flexible display that characterize, for example, a user's flexing of the flexible display. A user is able to flex a flexible display such as by bending, folding, or bending and folding, the flexible display. The below described systems and methods determine likely unintended flexing of the flexible display as would be applied to select a function to be performed. If an unintended flexing is determined, it is excluded from user input processing such that the location and other characterizations of the flexing are not evaluated to determine which, if any, function should be activated or which user input was indicted by that unintended flexing.

Unintended flexings of a flexible display include, for example, one or more of the following based upon the design or expected operation of a device: flexings associated with placing or removing the flexible display into or out of a storage configuration; flexings that occur outside the user's visible area, such as within a device's housing; flexings that are near edges or boundaries of a displayed image, image portion, or physical display area; flexings with a specified degree of bending or orientation; flexings that do not intersect with other flexings; flexings that are near known areas of likely unintended flexings; flexings that have a motion or other variation with time; and flexings that are not in proximity to a selectable user interface element. If a flexing is not determined to be an excluded flexing, the flexing is included in user input processing to determine, for example, if the flexing selects, activates, or otherwise indicates a graphical user interface element on the flexible display. Based upon the determinations of the user input processing, a process or other action is able to be started, as is understood by practitioners of ordinary skill in the relevant arts in light of the present discussion.

The processing of display flexing can include "tracking" unintended flexing through a fold memory that stores a fold history. In one example, initial estimates of unintended display flexings that are to be excluded from user input processing are made by identifying flexings of the flexible display that do not pass near any selectable user interface elements. These estimates of unintended flexings are developed by identifying repeated flexings of the flexible display in these locations even as different images are presented on the flexible display. As different graphical user interface elements are presented on the flexible display over time, such as user interface screens containing different sets of user activated icons, those graphical user interface elements are often presented in different locations. The unintended flexings, however, will generally not move when the displayed image changes and the locations of the user activated icons are different. In one example, a controller identifies the flexings that do not move as the displayed image is changed. Flexings that recur in the same location even as user activated icons move are identified as likely unintended flexings that should be excluded from user input processing. Characterizations of these identified flexings are added to the list of excluded flexings.

FIG. 1 is a block diagram of an electronic device 100 in accordance with one example. The electronic device 100 is a flexible display user input receiving system that includes a flexible display 102 through which a user is able to enter commands by flexing, such as by bending, folding, or bending and folding, the flexible display 102. The flexible display 102 has associated flexing sensors 104, 106 to sense and characterize flexing of the flexible display 102. The flexing sensors 104, 106 sense flexings of the flexible display 102 that are able to be either intended flexings by a user to, for example, activate a function by selecting a user selectable icon presented on the flexible display 102, or an unintended flexing as is described below.

The illustrated flexible display 102 includes flexing sensors such as an integral horizontal flexing sensor 104 and an integral vertical flexing sensor 106 to sense and characterize flexing of the flexible display 102. The flexing sensors sense and characterize flexing by determining, for example, an axis along which the flexible display 102 is flexed, a magnitude of the flexing as well as the direction and orientation of flexing. The direction or orientation of flexing is able to be, for example, a concave flexing or a convex flexing. The orientation of flexing is the direction of the axis along which the flexible display 102 is flexed. The integral horizontal sensor 104 senses and characterizes flexing along a vertical axis of the flexible display 102. The integral vertical sensor 106 senses and characterizes flexing along a horizontal axis of the flexible display 102. Axes of flexing other than vertical and horizontal are able to be determined by combining flexing characterization data from both the integral horizontal flexing sensor 104 and the integral vertical flexing sensor 106. Further examples are able to use any suitable type of sensor to detect, characterize, or detect and characterize the flexing of the flexible display 102.

The flexible display 102 in one example is an electronically controlled display that is fabricated so as to be flexible by one or both of bending and folding. As is familiar to practitioners of ordinary skill in the relevant arts, a flexible display 102 in one example is able to be fabricated as a thin, Organic LEDs (OLEDs) arrangement that allows a user of the display to provide user input by flexing the display. Associated flexing sensors are positioned either within or in proximity to the flexible display to sense and characterize how a user flexes the flexible display 102.

A user is able to, for example, fold the flexible display 102 along a certain line across the face of the flexible display 102 in order to select a particular function. For example, a selectable user interface element such as an icon or other graphical indicator is able to be presented at a location within the flexible display 102 and folding the flexible display 102 along a fold line, i.e. axis of flexing, which runs through that icon selects a function associated with that icon.

A display controller 108 receives flexing sensor data 120 from the associated sensors of the flexible display 102, such as from the integral horizontal flexing sensor 104, the integral vertical flexing sensor 106, or both. The display controller 108 provides to the flexible display 102 display data 122 that defines a presentation of image data. The flexing sensors, including the horizontal flexing sensor 104 and the vertical flexing sensor 106, detect flexing of the flexible display 102 and provide that data to the display controller 108. The display controller 108 characterizes that flexing and provides that characterization to a controller 110. Characterizations of the flexing of a flexible display 102 include determination of a location of the flexing on the flexible display 102, determination of a magnitude of the flexing, determination of a direction of the flexing, and also a determination of an orientation of an axis of the flexing.

The controller 110 of one example includes a user input controller that receives the characterizations of flexing of the flexible display 102. The controller 110 of one example also accesses an excluded flexings storage 112. The excluded flexings storage 112 stores characterizations of flexings that correspond to flexings of the flexible display 102 that are determined to not be associated with a valid user input. Examples of excluded flexings are described in further detail below. The user input controller within the controller 110 of one example determines, based on the received characterizations of flexing of the flexible display, if the flexing corresponds to an excluded flexing. If the flexing does not correspond to an excluded flexing, the flexing characterization is included in user input processing to determine, for example, if the flexing is an indication to activate or select an icon or other selectable user interface element presented on the flexible display 102. If the flexing does correspond to an excluded flexing, the processing excludes that flexing from user input processing to reduce the likelihood that such flexings falsely trigger activation of a user interface element and cause an unintended operation to be initiated by the controller 110.

The controller 110 is also able to store a history of flexings of the flexible display 102 into a fold memory 114. As described in further detail below, the processing of some examples adaptively determines unintended flexings by determining if folds that are not proximate to a selectable user interface element, such as an icon, occur at different times when icons are presented on the flexible display at different locations.

Figure 2:
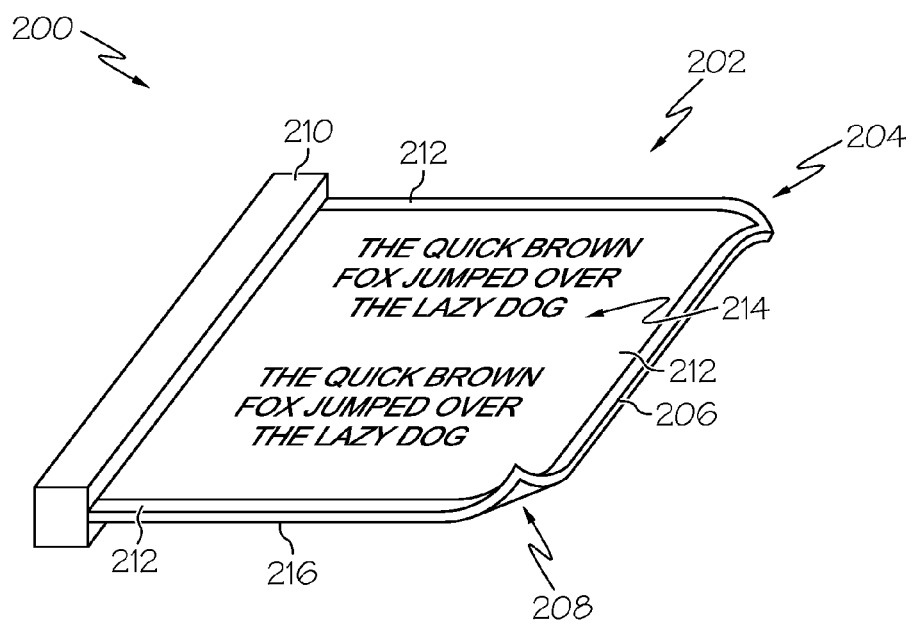
FIG. 2 illustrates a deployed flexible display in accordance with one example.

FIG. 2 illustrates a deployed flexible display 200, in accordance with one example. The deployed flexible display 200 depicts an electronic flexible display element 202, which is generally referred to as a flexible display, that is attached to a housing 210. The electronic flexible display element 202 in this example is able to be rolled or folded into the housing 210 for compact storage. When a user desires to view images displayed on the electronic flexible display element 202, the electronic flexible display element 202 is withdrawn or deployed from the housing 210 to form the deployed flexible display 200. Once the electronic flexible display element 202 is deployed from the housing 210, a user is able to flex the electronic flexible display element 202 to provide user input, as is described above.

The electronic flexible display element 202 displays an image within a image area 214. The image area 214 of this example is less than the area of an entirety of the electronic flexible display 202 and is separated from the edge of the electronic flexible display 202 by a border 212 that surrounds the image area 214. In further examples, the electronic flexible display element 202 is able to display an image without a border.

The electronic flexible display element 202 has a distal edge 206. The distal edge 206 in this example is not attached to a rigid member and is able to bend due to various forces that are not intended as user inputs. The operation of the deployed flexible display 200 in this example operates to identify likely unintended flexings of the electronic flexible display element 202 and exclude those flexings from user input processing.

The edges of the electronic flexible display element 202 are able to be bent either by a user's intended actions or by various unintended forces. For example, a downturn bend 204 is shown on one corner of the electronic flexible display element 202. Such a downturn bend 204 can be caused by the unsupported weight of that corner of the electronic flexible display element 202. An upturn bend 208 is also shown on another corner of the electronic flexible display element 202. The upturn bend 208 may result from a deformation of the electronic flexible display element 202 material that could be caused by, for example, a damaging fold or bend.

The downturn bend 204 and the upturn bend 208 are unintended flexings of the electronic flexible display element 202 and do not reflect a user's input. In one example, a controller within the housing 210 of the deployed flexible display 200 stores characterizations of excluded flexings that correspond to flexings that are not associated with a user input. In the example of the deployed flexible display 200, the downturn bend 204 or the upturn bend 208 can be characterized as one or more of being within a specified proximity to an edge of the electronic flexible display element 202, as being outside of the image area 214, or as being within a specified proximity of the edge of the image area 214. In evaluating the locations of these flexings, the value of the specified proximity of these flexings relative to the specified feature, such as the edge of the image area 214, is able to be determined based upon, for example, one or more empirical observations of flexings that are likely to occur but that are not associated with a user's input. The value of the specified proximity that is used by a particular device or by a particular user input mode of a device is able to be influenced by, for example, the rigidity, size or both rigidity and size of the electronic flexible display element 202.

In various examples, a controller monitors the flexing sensors on the electronic flexible display element 202 and receives characterizations of the present flexing of the electronic flexible display element 202. The controller compares the received characterizations of present flexings of the electronic flexible display element 202 that cause the downturn bend 204 or the upturn bend 208 and determines if those characterizations satisfy one or more of stored characterizations of excluded flexings. The excluded flexings defined for this example are such that the downturn bend 204 and the upturn bend 208 satisfy one or more of the above listed criteria and the processing thereby determines that flexings causing the downturn bend 204 or the upturn bend 208 are excluded flexings. Based upon this determination, the controller determines that the downturn bend 204, the upturn bend 208, or both, are not a valid user input flexing and excludes them from user input processing.

Figure 3:
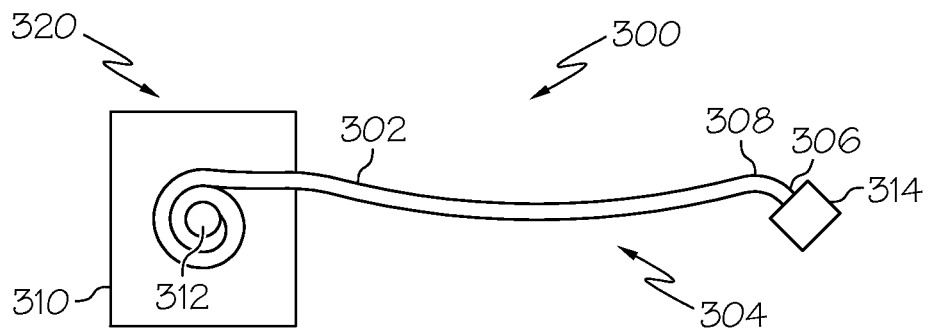
FIG. 3 illustrates an unrolled display configuration for a first flexible display that is a rollup-type flexible display, in accordance with one example.
Figure 4:
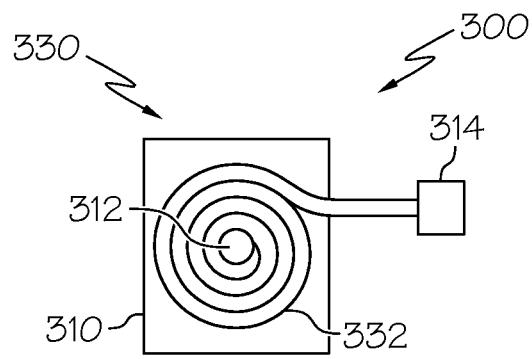
FIG. 4 illustrates a rolled display configuration for the first flexible display that is a rollup-type flexible display, in accordance with one example.

FIG. 3 illustrates an unrolled display 320 configuration for a first flexible display 300 that is a rollup-type flexible display, in accordance with one example. FIG. 4 illustrates a rolled display 330 configuration for the first flexible display 300 that is a rollup flexible display 300, in accordance with one example. The unrolled display 320 includes an electronic flexible display element 302 that is able to be rolled into a stored position onto a roller 312 within a display housing 310. The display housing 310 allows the electronic flexible display element 302 to flex into a stored position by rolling into the stored position 332 onto the roller 312 to form the rolled display 330. In the stored position 332, the electronic flexible display element 302 is wrapped around the roller 312. A controller monitoring flexing sensors on the electronic flexible display element 302 receives an indication of the flexing of the electronic flexible display element 302 as it is wrapped around the roller 312. In one example, the rollup flexible display 300 defines as an excluded flexing a characterization of the flexing of the electronic flexible display element 302 when it is wrapped around the roller 312 to be placed into the stored position 332. Since the flexing of the flexible display element when it is wrapped around the roller 312 is an excluded flexing, a user input controller detects this flexing and excludes it from user input processing. Similarly, flexing of the electronic flexible display element 302 out of the stored position 332 to create the unrolled display 320 is also stored as an excluded flexing and is excluded from user input processing.

The electronic flexible display element 302 has a rigid display support 314 that extends along a distal edge 306 of the electronic flexible display element 302. The distal edge 306 of the electronic flexible display element 302 is similar to the distal edge 206 discussed above with regards to FIG. 2. The rigid display support 314 is fastened to the distal edge 306 of the flexible display and operates to cause the distal edge 306 to remain straight and prevents unintended flexings along the distal edge 306. For example, the rigid display support 314 is able to reduce occurrences of the downward bend 204 and the upward bend 208 that are discussed above with regards to FIG. 2. The rigid display support 314 also prevents the distal edge 306 from inadvertently retreating into the display housing 310.

The rigid display support 314, however, is able to cause a sharp bend 308 of the electronic flexible display element 302 at a location proximate to the distal edge 306 to which it is fastened. The sharp bend 308 may be caused on the unrolled display 320 by, for example, a user's holding the rigid display support 314 and twisting it downwardly from the plane of the electronic flexible display element 302. Such twisting is likely a result of a user's trying to move or adjust his or her grip of the rigid display support 314 and is not likely to be an intended user input action. A user input controller monitoring flexing sensors on the electronic flexible display element 302 receives an indication of the flexing of the electronic flexible display element 302 that causes the sharp bend 308. In one example, the rollup flexible display 300 stores a characterization of flexings in the location of the sharp bend 308, i.e., near the rigid display support 314, as being unlikely to be a valid user input and stores them in an excluded flexings storage. The sharp bend 308 also has an orientation of flexing that is parallel to the rigid display support 314. Based upon one or more of the orientation of the sharp bend 308 and its location near the rigid display support 314, the controller determines that the sharp bend 308 is not a valid user input flexing and is excluded from user input processing.

The electronic flexible display element 302 may further have a bend 304 caused by the weight of the electronic flexible display element 302. In use, a user typically holds the rollup flexible display 300 with one hand grasping the housing 310 and another hand grasping the rigid display support 314. The user is not likely to maintain tension on the electronic flexible display element 302 between the housing 310 and the rigid display support 314 to keep the electronic flexible display element 302 taught and straight, thereby resulting in the bend 304.

A controller monitoring flexing sensors on the electronic flexible display element 302 receives an indication of the flexing of the electronic flexible display element 302 that causes the bend 304. In one example, the rollup flexible display 300 stores a characterization of flexing that have a degree of flexing of the bend 304 as being an insufficient degree of flexing to represent a valid user input. The bend 304 also has an orientation of flexing that is parallel to the rigid display support 314. Bends of such orientation are also able to be defined as excluded flexings, particularly when combined with a degree or direction of flexing. The direction of the bend 304 is concave, which is likely caused by gravity pulling on the electronic flexible display element 302 when it is in its likely position when held by a user for viewing. Based upon one or more of the orientation of the bend 304, its relatively shallow degree of flexing, the direction of flexing, or any combination of these characterizations, the user input controller identifies that the bend 304 is an excluded flexing and is not a valid user input. Based upon one or more of these determinations by the processing of the rollup flexible display, the bend 304 is characterized as an excluded flexing and is excluded from user input processing.

Figure 5:
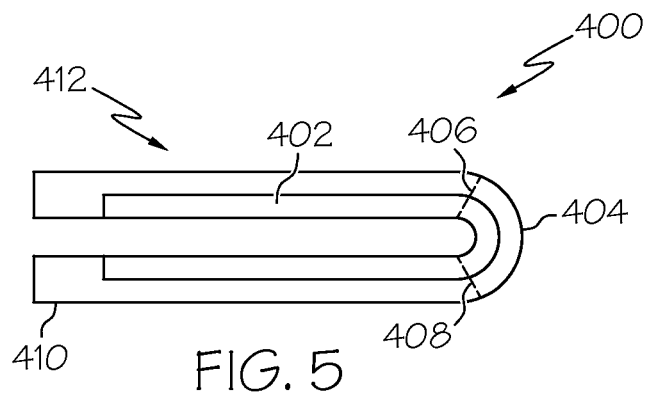
FIG. 5 illustrates a folded state of a second flexible display, in accordance with one example.

FIG. 5 illustrates a folded state 400 of a second flexible display device 412 that is one type of folding flexible display, in accordance with one example. The folded state 400 shows the second flexible display device 412 to include a flexible display 402 held by a device body that is a foldable frame 410. The foldable frame 410 is a device body in the form of an articulating frame. The folded state 400 shows the foldable frame 410 in its folded state. In the folded state, the foldable frame 410 has an articulation point 404 that is between a first folded edge 406 and a second folded edge 408. In the folded state, the foldable frame 410 allows the flexible display to flex into a stored position by putting the flexible display 402 in a first shape in which it is bent at the articulation point 404. Flexing of the flexible display 402 into the folded state 400 or out of the folded state 400 is not a user input but is simply performed to place the second flexible display device 412 into a smaller configuration to facilitate carrying or storing. As such, the processing stores a characterization of a flexing of the flexible display 402 going into the folded state 400 or out of the folded state 400 as an excluded flexing that is to be excluded from user input processing.

Figure 6:
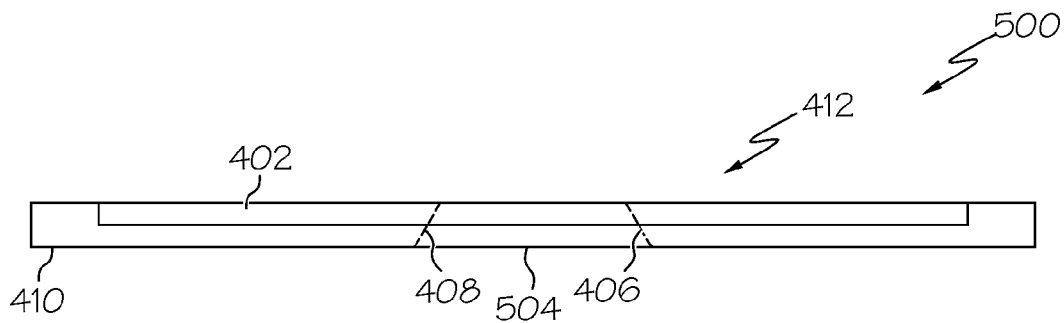
FIG. 6 illustrates an unfolded state of the second flexible display device depicted in FIG. 5, in accordance with one example.

FIG. 6 illustrates an unfolded state 500 of the second flexible display device 412 depicted in FIG. 5, in accordance with one example. The unfolded state 500 is obtained by opening the foldable frame 410 from the folded state 400. In the illustrated example, the unfolded state 500 is obtained by articulation of the articulating frame, i.e., the folding frame 410, at the articulation point 404 from the folded state 400 to the unfolded state 500. In the unfolded state 500, the articulation point 404 becomes straight and is depicted as a straight articulation point 504 and the flexible display 402 is now substantially flat. The straight articulation point 504 is between the first folded edge 406 and the second folded edge 408.

In one example, a controller within the second flexible display device 412 stores characterizations of flexings of the flexible display 402 that correspond to articulation of the articulation point 404 from the folded state 400 to the unfolded state 500 and articulation of the articulation point 404 from the unfolded state 500 to the folded state 400. These flexings are characterized as not being valid user inputs. The controller monitors flexing sensors on the flexible display 402 and receives characterizations of the present flexing of the flexible display 402. The controller compares the received characterizations of present flexings that result from the articulation of the articulation point 404 when the folding frame 410 moves from one to the other state of either the folded state 400 or the unfolded state 500. The controller determines if the received characterizations of those flexings correspond to such an articulation and if so, determines that those flexings are excluded flexings. Based upon this determination, the controller determines flexing of the flexible display 402 associated with the articulation of the articulation point 404 is an exclude flexing and as such is not a valid user input flexing. Therefore, the articulation of the articulation point 404 is excluded from user input processing.

Figure 7:
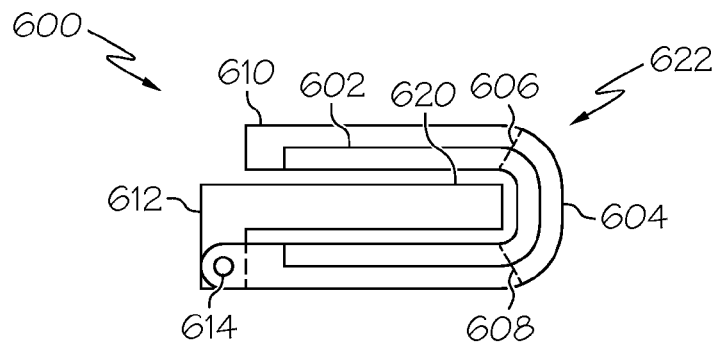
FIG. 7 illustrates a folded state of a third flexible display device, in accordance with one example.

FIG. 7 illustrates a folded state 600 of a third flexible display device 622 that is another type of foldable flexible display, in accordance with one example. The folded state 600 shows the third flexible display device 622 to include a flexible display 602 held by a device body that is a foldable frame 610. The foldable frame 610 in this example is a device body in the form of an articulating frame. The foldable frame 610 further includes a frame 620 about which the flexible display 602 conforms when in the folded state 600. The frame 620 is coupled to the remainder of the foldable frame 610 by joint 614.

The folded state 600 shows the foldable frame 610 in its folded state. In the folded state, the foldable frame 610 has an articulation point 604 that is bounded by a first folded edge 606 and a second folded edge 608. The foldable frame 610 allows the flexible display to flex into a stored position when the foldable frame 610 is in its folded state. In the folded state, the flexible display 602 is in a first shape in which it is bent at the articulation point 604 so as to conform to the frame 620. Flexing of the flexible display 602 into the folded state 600 or out of the folded state 600 is not a user input but is simply performed to place the third flexible display device 622 into a smaller configuration to facilitate carrying or storing.

Figure 8:
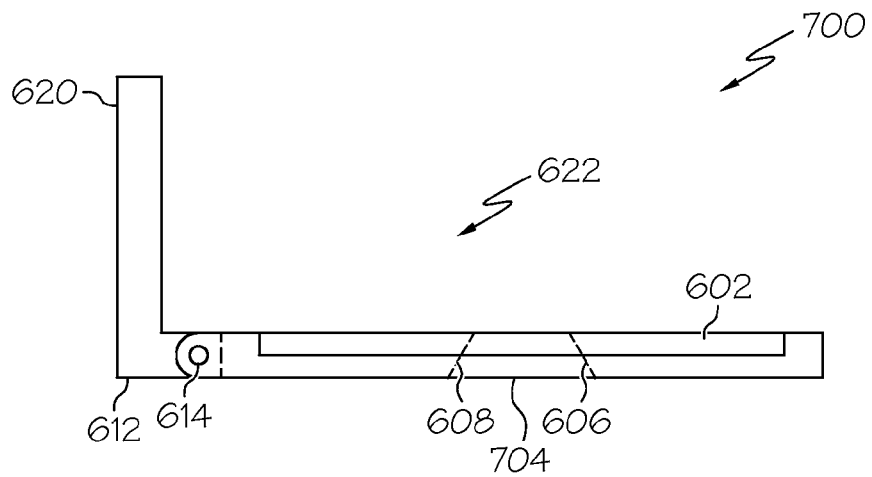
FIG. 8 illustrates an unfolded state of the third flexible display depicted in FIG. 7, in accordance with one example.

FIG. 8 illustrates an unfolded state 700 of the third flexible display 622 depicted in FIG. 7, in accordance with one example. The unfolded state 700 is obtained by opening the foldable frame 610 from the folded state 600. In the illustrated example, the unfolded state 700 is obtained by articulation of the articulating frame, i.e., the folding frame 610, at the articulation point 604 from the folded state 600 to the unfolded state 700. The frame 620 is also rotated about joint 614 to expose the entire flexible display 602. In the unfolded state 700, the articulation point 604 becomes straight and is depicted as a straight articulation point 704 and the flexible display 602 is now substantially flat. The straight articulation point 704 is between the first folded edge 606 and the second folded edge 608.

In one example, a controller within the third flexible display device 622 stores characterizations of flexings of the flexible display 602 that correspond to articulation of the articulation point 604 from the folded state 600 to the unfolded state 700 and articulation of the articulation point 604 from the unfolded state 700 to the folded state 700. These flexings are characterized as not being valid user inputs. The controller monitors flexing sensors on the flexible display 602 and receives characterizations of the present flexing of the flexible display 602. The controller compares the received characterizations of present flexings that result from the articulation of the articulation point 604 when the folding frame 610 moves from one to the other state of either the folded state 600 or the unfolded state 700. The controller determines if the received characterizations of those flexings correspond to such an articulation and if so, determines that those flexings are excluded flexings. Based upon this determination, the controller determines flexing of the flexible display 602 associated with the articulation of the articulation point 604 is an excluded flexing and is therefore not a valid user input flexing. As such, it is excluded from user input processing.

Figure 9:
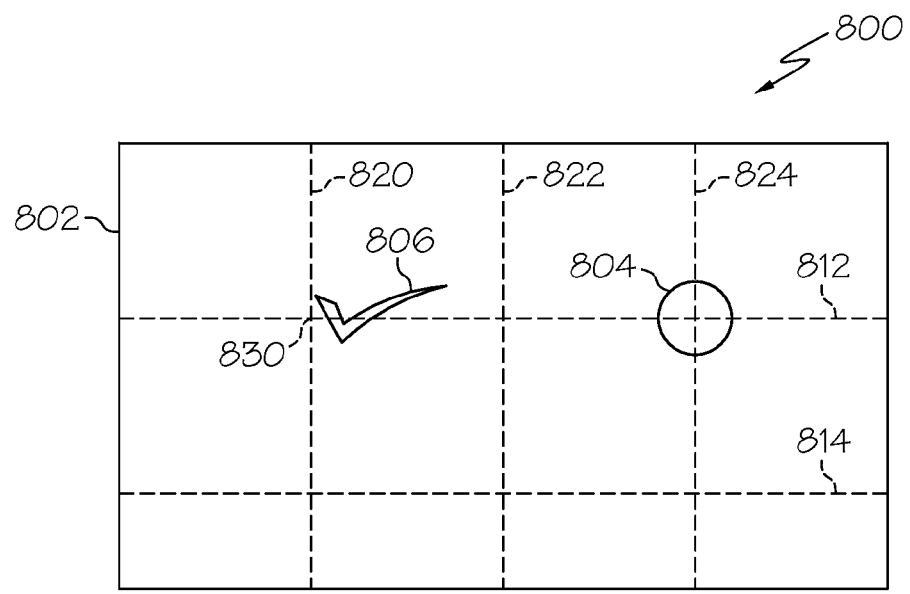
FIG. 9 illustrates a user input display image on a flexible display, in accordance with one example.

FIG. 9 illustrates a user input display image 800 on a flexible display 802, in accordance with one example. The user input display image 800 is displayed on a flexible display 802, such as the electronic flexible display element 202, described above. The user input display image 800 includes images of two selectable user interface elements. The illustrated selectable user interface elements include images of two icons, a stop sign icon 804 and a check mark icon 806. In one example, these selectable user interface elements are able to be selected, thereby causing actions associated with the selected icon to be performed, by a user's flexing the flexible display 802 to cause a bending of the flexible display through or in proximity to the icon.

The user input display image shows several fold lines that correspond to potential flexing of the flexible display 802. A first vertical fold 820 is shown to be proximate to, but not passing through, the check mark icon 806. Various examples are able to be configured to accept the first vertical fold 820 as a selection of the nearby icon, the check mark icon 806. Some examples will not determine that the first vertical fold 820 alone is a selection of the check mark icon 806.

A second vertical fold line 822 is relatively well separated from, and is therefore not proximate to, any selectable user interface element. In one example, the second vertical fold line 822 is determined to not be a valid input flexing. The distance between a selectable user interface element and a flexing that is determined to be a valid input flexing in one example is determined based upon many factors, such as the size of the flexible display 802, the size of the selectable user interface elements such as the stop sign icon 804 and the check mark icon 806, the relationship between selectable user interface element size and the size of the flexible display 802, or any other characteristic or combination of characteristics.

A third vertical fold line 824 passes through the stop sign icon 804. The third vertical fold line 824 is therefore a flexing that is proximate to a selectable user interface element. In one example, the third vertical fold line 824 is determined to be a valid user input and is not determined to be an excluded flexing.

A first horizontal fold line 812 is shown to pass through the stop sign icon 804 and the check mark icon 806. In one example, a user indicates a selection of an icon by forming two folds of the flexible display 802. Because the first horizontal fold line 812 passes through at least one selectable user interface element, it is determined in one example to be a valid input flexing. The first horizontal fold line 812 is therefore not excluded from further user input processing. In the illustrated example, the first horizontal fold line 812 is interpreted along with other flexing of the flexible display 802 to determine which selectable user interface element is selected. For example, a user flexing the flexible display 802 to form the first horizontal fold line 812 in combination with a flexing causing the first vertical fold line 820 would select the check mark icon 806. Such a combination of flexing would cause the first horizontal fold line 812 to intersect with the first vertical fold line 820 within the image area of the user input display image 800. In some examples, the first vertical fold line 820 is insufficient to select the check mark icon 806, but a combination of the first vertical fold line 820 and the first horizontal fold line 812 specify a selection of that icon.

In another example, a user flexing the flexible display 802 to form the first horizontal fold line 812 in combination with a flexing causing the third vertical fold line 824 would select the stop sign icon 804. The first horizontal fold line 812 is proximate to at least one selectable user interface element. In contrast, a second horizontal fold line 814 is shown as being removed from, and therefore not proximate to, any selectable user interface element. Because the second horizontal fold line 814 is not proximate to any selectable user interface element, it is determined to not be a valid input flexing and is determined to be an excluded flexing that is excluded from user input processing.

In one example, the second vertical fold line 822 is caused by articulation of an articulating frame holding the flexible display 802, such as the articulation point 404 of the foldable frame 410 discussed above. In that case, the second vertical fold 822 remains in the same location regardless of the image depicted on the flexible display. In contrast, the first vertical fold line 820 and the third vertical fold line 824 are performed by a user to select the stop sign icon 804 or the check mark icon 806, respectively. As the location of displayed icons changes due to different displays or presentation of different user options, the folds used to select those differently located icons will correspondingly change. However, the second vertical fold line 822 will recur whenever the articulating frame is articulated without regard to the displayed image. In one example, a controller stores a characterization of the second vertical fold and notes that location as an excluded flexing.

Figure 10:
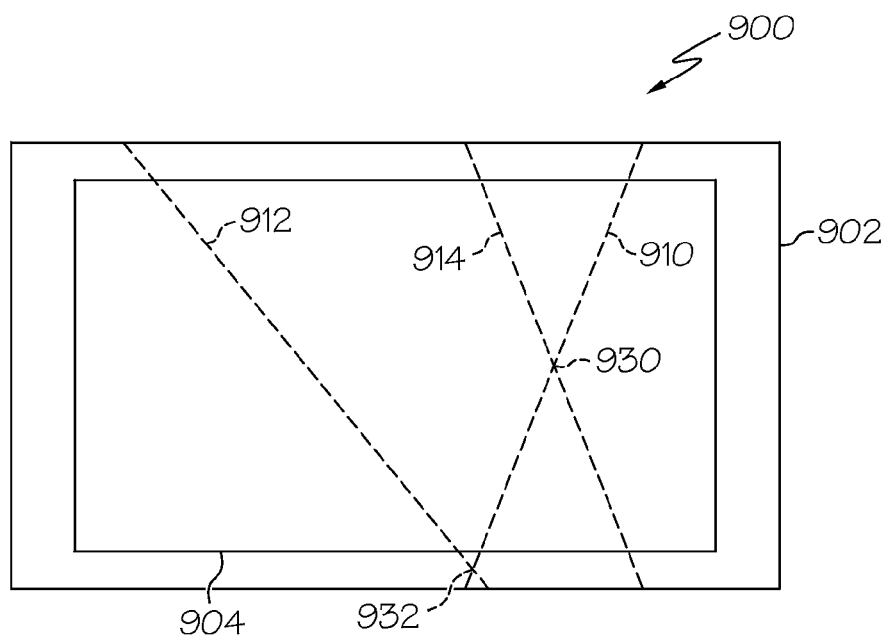
FIG. 10 illustrates a several intersecting fold line flexible display, in accordance with an example.

FIG. 10 illustrates a several intersecting fold line flexible display 900, in accordance with an example. The several intersecting fold line flexible display 900 depicts a flexible display 902 that is configured to present an image within an image area 904. The several intersecting fold line flexible display 900 shows several fold lines that a user can form by flexing of the flexible display 900.

The several intersecting fold line flexible display 900 includes a first fold line 910, a second fold line 912, and a third fold line 914. The first fold line 910 intersects the third fold line 914 at a first intersection point 930. As is shown, the first intersection point 930 is within the image area 904. A controller receiving characterizations of the flexing of the flexible display 902 in one example determines that folding the flexible display so as to simultaneously form the first fold line 910 and the third fold line 914 is a valid input flexing and is included in user input processing.

The first fold line 910 also intersects the second fold line 912 at a second intersection point 932. As is shown, the second intersection point 932 is within the flexible display 902, but it is not within the image area 904. A controller receiving characterizations of the flexing of the flexible display 902 in one example stores characterizations as excluded flexings any combination of multiple flexings that intersect outside of the image area 904. In one example, folding the flexible display 902 so as to simultaneously form the first fold line 910 and the second fold line 912 is determined to be an excluded flexing and therefore is not a valid input flexing. The controller therefore excludes such flexing from user input processing.

Figure 11:
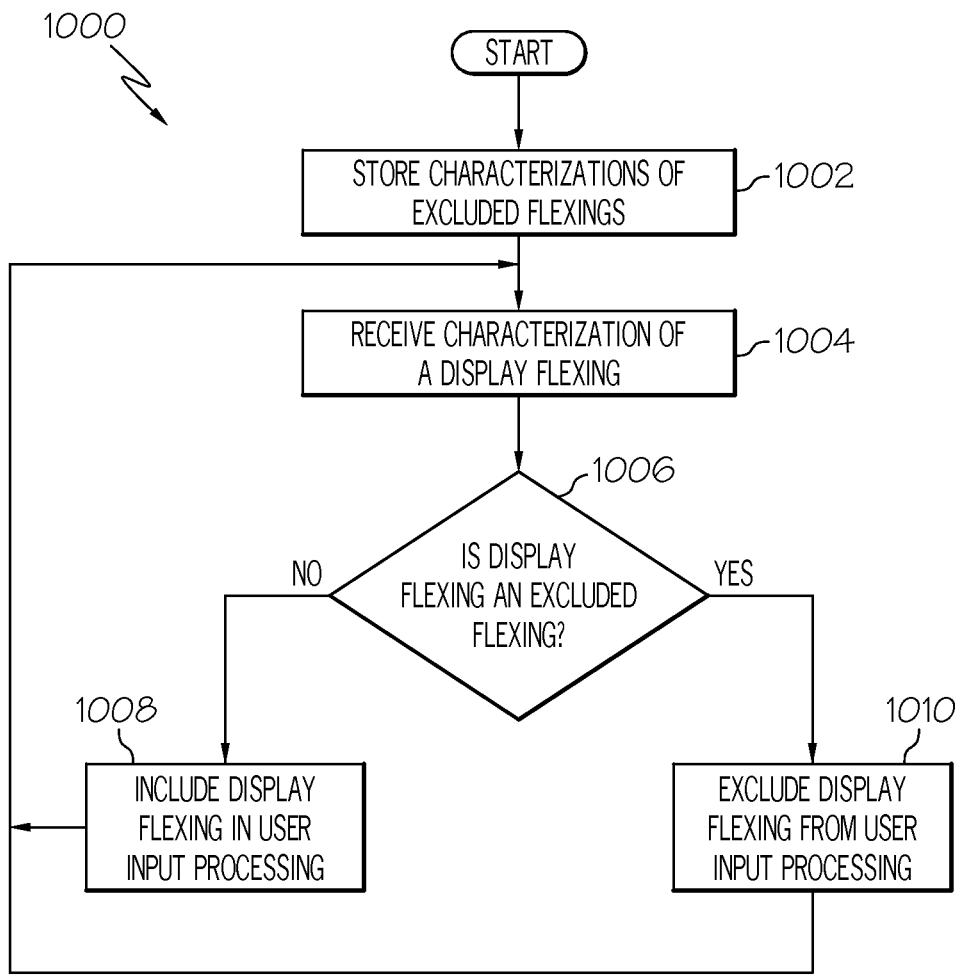
FIG. 11 illustrates a display activation adaptation process according to one example.

FIG. 11 illustrates a display activation adaptation process 1000 according to one example. The display activation adaptation process 1000 is a method for receiving commands from a flexible display system that is performed by a controller of a device that has a flexible display. The method for receiving commands from a flexible display system is performed by a device that allows a user to activate options, such as selecting displayed icons, by flexing the flexible display in a prescribed manner. The operation of the display activation adaptation process 1000 adapts the processing of display flexings to exclude certain flexings from user input processing.

The display activation adaptation process 1000 begins by storing, at 1002, characterizations of excluded flexings.

Excluded flexings correspond to flexings of a flexible display that are not likely to be associated with valid user inputs. Examples of excluded flexings are described above. After storing excluded flexings, the display activation adaptation process 1000 continues to receive and process characterizations of display flexings. In various examples, the storing of excluded flexings is performed as part of a manufacturing process or is performed as part of a device configuration process separate from processing user inputs to a device including a flexible display.

The display activation adaptation process 1000 receives, at 1004, characterizations of a device flexing. The display activation adaptation process 1000 continues by determining, at 1006, if the display flexing is an excluded flexing. If the device flexing is determined to not be an excluded flexing, the process includes, at 1008, the display flexing in user input processing. If the device flexing is determined to be an excluded flexing, the process excludes, at 1010, the display flexing from user input processing. The process then returns to receive, at 1004, a characterization of a display flexing, as is described above.

Figure 12:
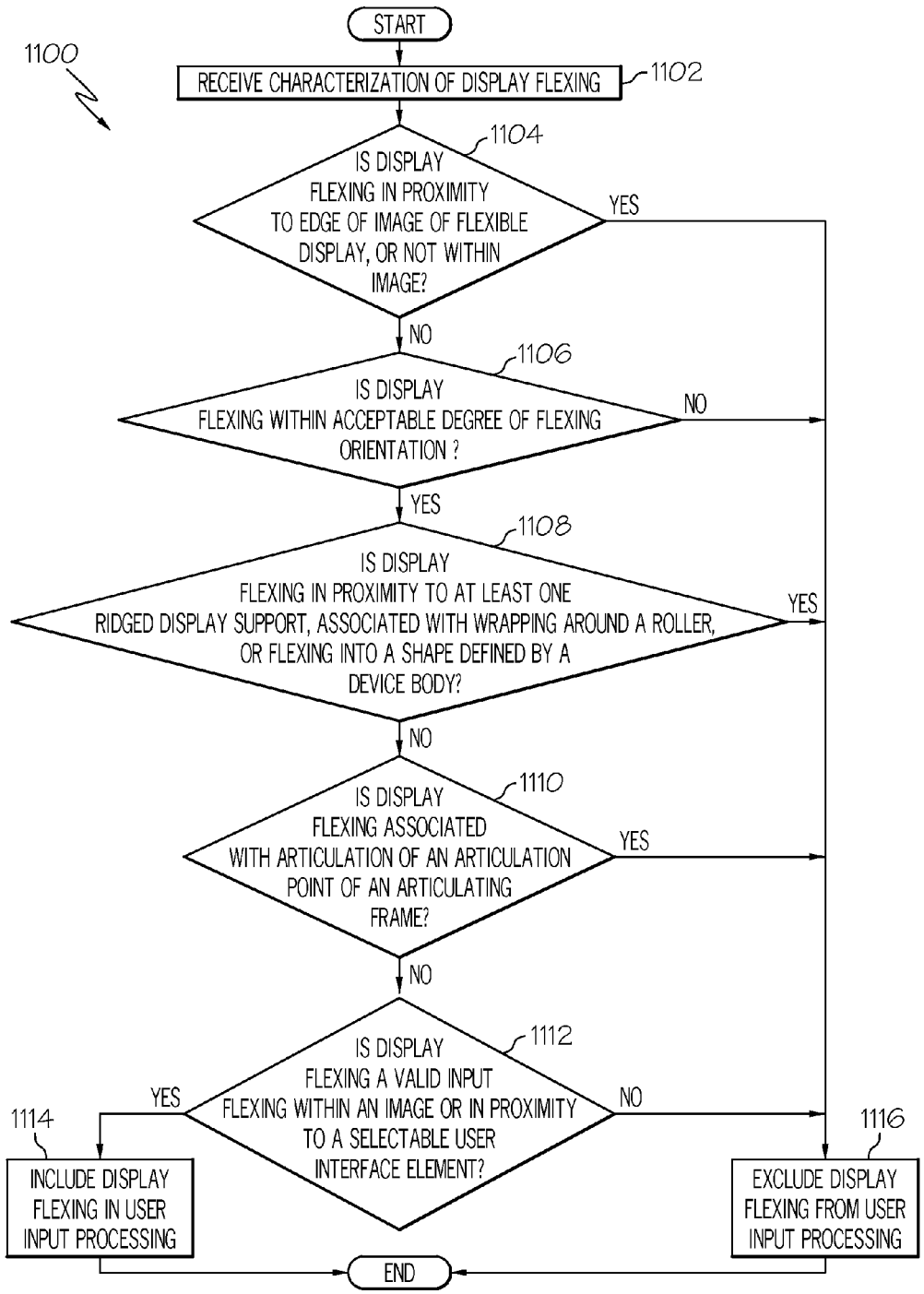
FIG. 12 illustrates a display flexing evaluation process according to one example.

FIG. 12 illustrates a display flexing evaluation process 1100 according to one example. The display flexing evaluation process 1100 is performed by a controller of a device that has a flexible display where a user is able to activate options, such as selecting displayed icons, by flexing the flexible display in a prescribed manner. The operation of the display flexing evaluation process 1100 determines which display flexings to exclude from or include in user input processing.

The display flexing evaluation process 1100 begins by receiving, at 1102, characterizations of a display flexing. The process continues by determining, at 1104, if the display flexing is in proximity to an edge of a displayed image or an edge of the flexible display, or if the display flexing is not within the displayed image. If any of these are true, the processing excludes, at 1116, the display flexing from user input processing and the process ends. In further examples, one or more of these conditions may not be tested and determining that condition would not exclude that flexing. For example, characterizations of flexings that are in proximity to an edge of the displayed image may not be stored by an alternative example and such flexings and would be included in user input processing.

If it is not determined that the display flexing is in proximity to an edge of an image or of the flexible display, or if the display flexing is within the image, the process continues by determining, at 1106, if the display flexing is within an acceptable degree of flexing or orientation. If it is not, the processing excludes, at 1116, the display flexing from user input processing and the process ends.

If the above conditions were not determined to be true, the process continues by determining, at 1108, if the display flexing is in proximity to at least one rigid display support, if it is associated with wrapping around a roller, or if the flexible display is flexing into a shape defined by a device body. If it is, the processing excludes, at 1116, the display flexing from user input processing and the process ends. Otherwise, the processing determines, at 1110, if the display flexing is associated with articulation of an articulation point of an articulating frame. If it is, the processing excludes, at 1116, the display flexing from user input processing and the process ends.

If the display flexing is not associated with articulation of an articulating frame, the process continues by determining, at 1112, if the display flexing is a valid input flexing that is within an image or that is in proximity to a selectable user interface element. If it is not, the processing excludes, at 1116, the display flexing from user input processing. If it is, the process continues by including, at 1114, the display flexing in the user input processing. The process then ends.

The above processing describes a number of possible excluded flexings. Various embodiments are able to include and check for only a subset of the above described flexings as excluded flexings. Further examples are also able to include characterizations of any other type of flexing as an excluded flexing.

Figure 14:
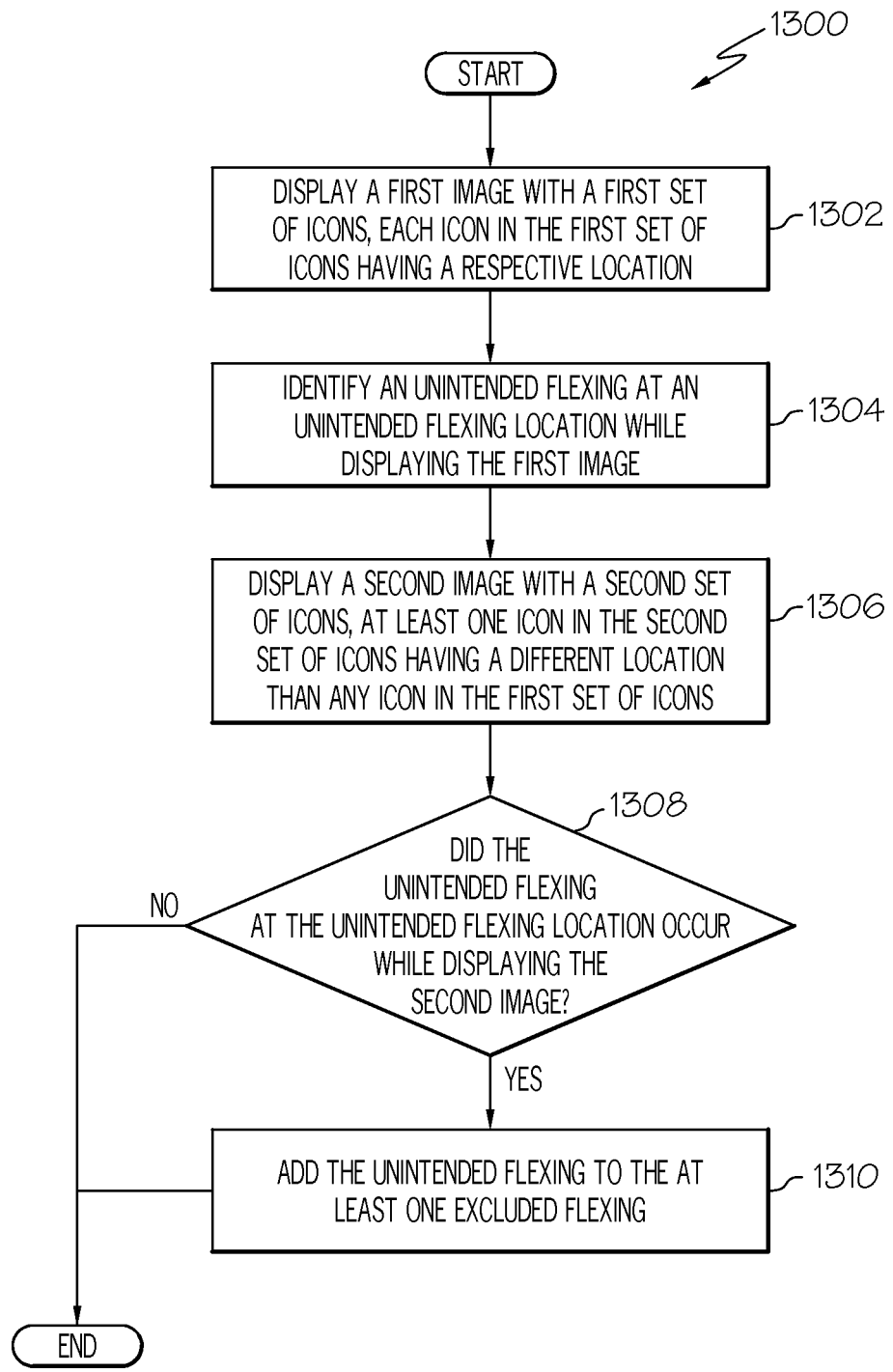
FIG. 14 illustrates an unintended display flexing identification process according to one example.

FIG. 14 illustrates an unintended flexing identification process 1300 according to one example. One example tracks unintended flexing of a flexible display and stores characterizations of potential unintended flexings into the fold memory 114 that stores a flexing history. An example of an unintended flexing that would be identified by the unintended flexing identification process 1300 is the sharp bend 308 described above with regards to rollup flexible display 300 in FIGS. 3 and 4. In one example, initial estimates of unintended flexings that are to be excluded from user input processing are identified as flexing of the flexible display where no user interface elements are displayed in a first image with a first set of icons that is displayed during a first time duration. A different, second image presenting user interface elements in different positions is then displayed during a second time duration subsequent to the first time duration. The locations of icons move between the display of the first image and the second image. However, the unintended flexings that are not associated with valid user inputs reoccur and do not move. In one example, the unintended flexings that are determined to occur during the display of the first image and also determined to subsequently occur during the display of the second image are added to the characterizations of those flexings to the list of excluded flexings.

The unintended flexing identification process 1300 begins by displaying, at 1302, on a flexible display during a first time duration, a first image with a first set of icons. Each icon in the first set of icons has a respective location within the image displayed on the flexible display. The unintended flexing identification process 1300 continues by identifying, at 1304, a first display flexing that is determined to be an unintended flexing of the flexible display. An unintended flexing occurs at an unintended flexing location during the first time duration. The identification of the unintended flexing includes, for example, determining a degree of flexing, an orientation of flexing, and a direction of flexing, that satisfies a characterization of an unintended flexing. In one example, characterizations of unintended flexings are stored in a memory of a controller performing the process. In one example, the location of the identified unintended flexing is stored in the fold memory 114.

The unintended flexing identification process 1300 continues by displaying, during a second time duration subsequent to the first time duration, a second image on the flexible display. The second image presents a second set of icons where at least one icon in the second set of icons has a different location than any icon within the first image. The unintended flexing identification process 1300 then determines, at 1308, if the first display flexing, which is an unintended flexing at the unintended flexing location, subsequently occurs during the second time duration while displaying the second image. This determination is able to be made by, for example, by retrieving from the fold memory 114 the location of the unintended flexing that was determined during the display of the first image. If the unintended flexing did occur during the first time duration and the second time duration, the processing adds, at 1310, the unintended flexing to the at least one excluded flexing. After adding the unintended flexing to the at least one excluded flexing, the unintended flexing will also be excluded from user input processing. The processing then ends after adding the unintended flexing to the at least one excluded flexing, or if the unintended flexing did not occur during the second time duration.

Figure 13:
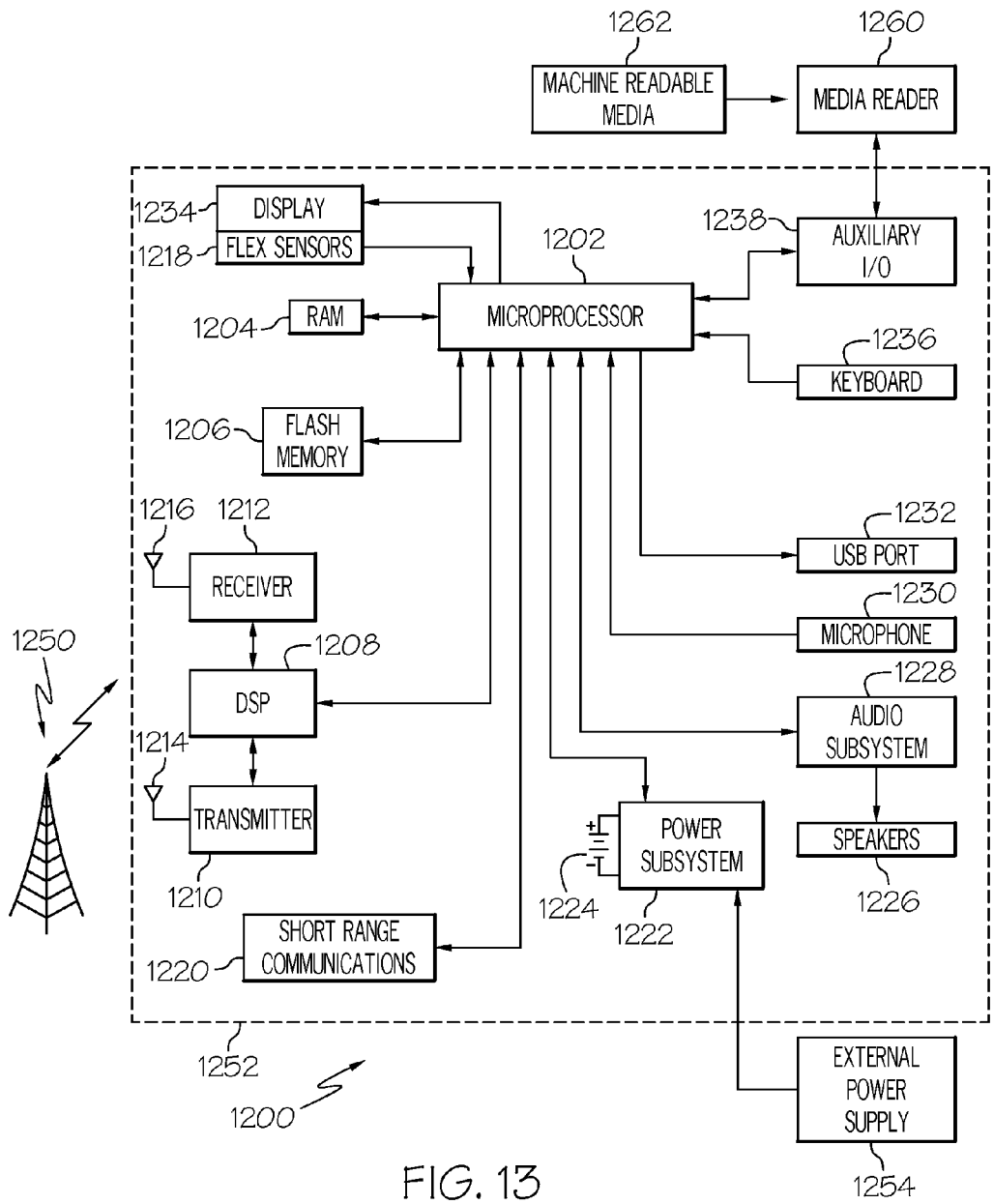
FIG. 13 is a block diagram of an electronic device and associated components in which the systems and methods disclosed herein may be implemented.

FIG. 13 is a block diagram of an electronic device and associated components 1200 in which the systems and methods disclosed herein may be implemented. In this example, an electronic device 1252 is a wireless two-way communication device that is able to provide one or both of voice and data communications capabilities. Such electronic devices communicate with a wireless voice or data network 1250 via any suitable wireless communications protocol or protocols. Wireless voice communications are performed using either an analog or digital wireless communications protocols according to the network 1250 to which it is connected. Data communications to and from the electronic device 1252 support exchanging data with other computer systems through any suitable network, such as the Internet. Examples of electronic devices that are able to incorporate the above described systems and methods include data pagers, data messaging devices, cellular telephones, tablet computing devices, or a data communication device that may or may not include telephony capabilities.

The illustrated electronic device 1252 is an example electronic wireless communications device includes two-way wireless communications component to provide wireless data communications with a wireless data network, a wireless voice network, or both. Such electronic devices incorporate communication subsystem elements such as a wireless transmitter 1210, a wireless receiver 1212, and associated components such as one or more antenna elements 1214 and 1216. A digital signal processor (DSP) 1208 performs processing to extract data from received wireless signals and to generate signals to be transmitted. The particular design of the communication subsystem is dependent upon the communication network and associated wireless communications protocols with which the device is intended to operate.

Data communications with the electronic device 1252 generally includes receiving data, such as a text message or web page download, through the receiver 1212 and providing that received data to the controller, which is implemented in this example as microprocessor 1202. The microprocessor 1202 is then able to further process the received data for output to the display 1234 or to other devices such as an auxiliary I/O device 1238 or through a Universal Serial Bus (USB) port 1232. The electronic device 1252 also allows a user to compose data items, such as e-mail or instant messages, using the keyboard 1236 in conjunction with the display 1234 and possibly an auxiliary I/O device 1238. Such composed items are then able to be transmitted over a communication network through the transmitter 1210.

The electronic device 1252 performs voice communications by providing received signals from the receiver 1212 to the audio subsystem 1228 for reproduction by speakers 1226. A user's voice is able to be converted to electrical signals by microphone 1230. Those electrical signals are then transmitted via transmitter 1210.

A short-range communications subsystem 1220 is a further optional component which may provide for communication between the electronic device 1252 and different systems or devices. For example, the short-range communications subsystem 1220 may include an infrared device and associated circuits and components or a Radio Frequency based communication module such as one supporting Bluetooth® communications, to provide for communication with similarly-enabled systems and devices.

The electronic device 1252 includes a microprocessor 1202 that controls device operations for the electronic device 1252. The microprocessor 1202 interacts with the above described communications subsystem elements to implement and control wireless communications with the network 1250. The microprocessor 1202 further performs control and data exchange functions by interacting with, for example, flash memory 1206, random access memory (RAM) 1204, auxiliary input/output (I/O) device 1238, USB Port 1232, display 1234, flex sensors 1218, keyboard 1236, audio subsystem 1228, microphone 1230, a short-range communications subsystem 1220, a power subsystem 1222, and any other device subsystems.

The display 1234 of one example is a flexible display and is physically connected to flex sensors 918 as is described above. Display 1234 is able to further include touch sensors to accept touch screen inputs from a user, such as scrolling gestures, and the like. The keyboard 1236 is able to include, for example, a complete alphanumeric keyboard, a telephone-type keypad, or a touch screen representation of a keyboard.

An internal power pack, such as a battery 1224, is connected to a power subsystem 1222 to provide power to the circuits of the electronic device 1252. The power subsystem 1222 includes power distribution circuitry to supply electric power to the various components of the electronic device 1252 and also includes battery charging circuitry to support recharging the battery 1224. An external power supply 1254 is able to be connected to the power subsystem 1222. The power subsystem 1222 includes a battery monitoring circuit that provide a status of one or more battery conditions, such as remaining capacity, temperature, voltage, current draw, and the like.

The USB port 1232 provides data communication between the electronic device 1252 and one or more external devices. Data communication through USB port 1232 enables various user data, such as data files or configuration parameters for the electronic device 1252 to be exchanged between the electronic device 1252 and an external device. The USB port 1232 is also able to be used to convey external power to the power subsystem 1222 from a suitable external power supply.

Operating system software used by the microprocessor 1202 is stored in flash memory 1206. In addition to, or in place of, flash memory 1206, a battery backed-up RAM or other non-volatile storage data elements are able to store operating systems, other executable programs, or both. As an example, a computer executable program configured to perform the display activation adaptation process 1000, and display flexing evaluation process 1100, described above, is included in a software module stored in flash memory 1206. Flash memory 1206 is also able to store, for example, the excluded flexings storage 112 and the fold memory 114.

RAM memory 1204 is used to store data produced or used by microprocessor 1202. RAM memory is further able to temporarily store program data from flash memory 1206 or from other storage locations. RAM 1204 is also used to store data received via wireless communication signals or through wired communications.

The microprocessor 1202 in some examples executes operating system software as well as various other software applications such as user applications, small, special purpose applications referred to as "apps," and the like. Some software, such as operating system and other basic user functions such as address books, personal information managers (PIMs), e-mail applications and the like, are able to be provided as part of the manufacturing process for the electronic device.

In addition to loading applications as part of a manufacturing process, further applications are able to be loaded onto the electronic device 1252 through, for example, the wireless network 1250, an auxiliary I/O device 1238, USB port 1232, short-range communications subsystem 1220, or any combination of these interfaces. Once these applications are loaded into the electronic device 1252, these applications are executed by the microprocessor 1202.

A media reader 1260 is able to be connected to an auxiliary I/O device 1238 to allow, for example, loading computer readable program code of a computer program product into the electronic device 1252 for storage into flash memory 1206. One example of a media reader 1260 is an optical drive such as a CD/DVD drive, which may be used to store data to and read data from a computer readable medium or storage product such as computer readable storage media 1262. Examples of suitable computer readable storage media include optical storage media such as a CD or DVD, magnetic media, or any other suitable data storage device. The media reader 1260 is alternatively able to be connected to the electronic device through the USB port 1232 or computer readable program code is alternatively able to be provided to the electronic device 1252 through the wireless network 1250.

Information Processing System

The subject matter of the present disclosure can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The subject matter of the present disclosure can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

NON-LIMITING EXAMPLES

Although specific embodiments have been disclosed, those having ordinary skill in the art will understand that changes can be made to the specific embodiments without departing from the spirit and scope of the present disclosure. The scope of the subject matter contained in the present disclosure is not to be restricted, therefore, to the specific embodiments, and it is intended that the appended claims cover any and all such applications, modifications, and embodiments within the scope of the present disclosure.

What is claimed is:

1. A flexible display user input receiving system, comprising:
   a flexible display configured to receive input from a user to indicate a selected graphical user interface element by flexing of the flexible display;
   at least one flexing sensor configured to characterize a flexing of the flexible display; and
   a user input controller, communicatively coupled to the at least one flexing sensor, the user input controller configured to:
      receive a characterization of a present flexing of the flexible display;
      determine if the characterization of the present flexing corresponds to an excluded flexing within at least one excluded flexing characterization, each of the excluded flexing characterizations corresponding to a flexing in a particular direction and along a particular axis of flexing of the flexible display not associated with a user input;
      provide, based on a determination that the present flexing does not correspond to an excluded flexing, a user selection corresponding to the present flexing that indicates a selected graphical user interface element on the flexible display; and
      exclude, based on a determination that the present flexing corresponds to an excluded flexing, the characterization of the present flexing from user input processing that determines user selections indicating a selected graphical user interface element on the flexible display.

2. The flexible display user input receiving system of claim 1,
   the flexible display configured to present an image within an image area, the image area comprising less than an entirety of the flexible display, and
   the at least one excluded flexing comprises a flexing of the flexible display that is outside of the image area.

3. The flexible display user input receiving system of claim 1,
   the flexible display configured to present an image within an image area, the image area comprising less than an entirety of the flexible display, and
   the at least one excluded flexing comprises a flexing of the flexible display that is within the image area and within a specified proximity of an edge of the image area.

4. The flexible display user input receiving system of claim 1, wherein the at least one excluded flexing comprises a flexing of the flexible display that is within a specified proximity of an edge of the flexible display.

5. The flexible display user input receiving system of claim 1, wherein the at least one excluded flexing comprises a flexing with at least one of a specified degree of flexing and orientation of flexing of the flexible display.

6. The flexible display user input receiving system of claim 1, further comprising at least one rigid display support, each of the at least one rigid display support fastened to a respective edge of the flexible display, the excluded flexing comprising flexing within a specified proximity to the at least one rigid display support.

7. The flexible display user input receiving system of claim 1, the user input controller further configured to:

display, for a first time duration, a first set of selectable user interface elements on the flexible display, each selectable user interface element within the first set of selectable user interface elements having a respective location;

determine, during the first time duration, that the present flexing is a first display flexing, the first display flexing corresponding to a display flexing not in proximity to a respective location of any of the selectable user interface elements within the first set of selectable user interface elements;

display, for a second time duration subsequent to the first time duration, a second set of selectable user interface elements on the flexible display, at least one selectable user interface element within the second set of selectable user interface elements having a respective location different from a respective location of any of the selectable user interface elements within the first set of selectable user interface elements;

determine, during the second time duration, a subsequent occurrence of the first display flexing; and add, in response to determining the occurrence of the first display flexing during the first time duration and the second time duration, the first display flexing to the at least one excluded flexing characterization.

8. The flexible display user input receiving system of claim 1, the user input controller further determining if the characterization of the present flexing comprises a valid input flexing, and the excluded flexing comprising any flexing that is not a valid input flexing.

9. The flexible display user input receiving system of claim 8, the flexible display configured to present an image of at least one selectable user interface element, the valid input flexing comprising flexing proximate to any of the at least one selectable user interface element.

10. The flexible display user input receiving system of claim 8, the flexible display configured to present an image within an image area, the image area comprising less than an entirety of the flexible display, and the valid input flexing comprising flexing with a first fold line and a second fold line where the first fold line intersects the second fold line within the image area.

11. The flexible display user input receiving system of claim 1, further comprising a display housing configured to allow the flexible display to flex into a stored position; and the excluded flexing comprising at least one of flexing into the stored position and flexing out of the stored position.

12. The flexible display user input receiving system of claim 11, wherein the display housing comprises a roller, and wherein the stored position comprises the flexible display being wrapped around the roller.

13. The flexible display user input receiving system of claim 11, wherein the display housing comprises a device body coupled to the flexible display, the stored position comprising the flexible display flexing into a first shape, the first shape defined at least in part by the device body.

14. The flexible display user input receiving system of claim 13, the device body comprising a frame about which the flexible display conforms to flex into the first shape.

15. The flexible display user input receiving system of claim 13, the device body comprising an articulating frame holding the flexible display, the articulating frame comprising at least one articulation point, the excluded flexing comprising flexing associated with articulation of an articulation point within the at least one articulation point.

16. A method for receiving commands from a flexible display system, the method comprising:

receiving a characterization of a present flexing of a flexible display, the present flexing indicating a selected graphical user interface element;

determining if the characterization of the present flexing corresponds to an excluded flexing within at least one excluded flexing characterization, each of the excluded flexing characterizations corresponding to a flexing in a particular direction and along a particular axis of flexing of the flexible display not associated with a user input;

provide, based on a determination that the present flexing does not correspond to an excluded flexing, a user selection corresponding to the present flexing that indicates a selected graphical user interface element on the flexible display; and excluding, based on a determination that the present flexing corresponds to an excluded flexing, the characterization of the present flexing from user input processing that determines user selections indicating a selected graphical user interface element on the flexible display.

17. The method of claim 16, the flexible display configured to present an image within an image area, the image area comprising less than an entirety of the flexible display, and the at least one excluded flexing comprising a flexing of the flexible display that is outside of the image area.

18. The method of claim 16, the flexible display comprising at least one rigid display support, each of the at least one rigid display support fastened to a respective edge of the flexible display, and the excluded flexing comprising flexing within a specified proximity to the at least one rigid display support.

19. The method of claim 16, the method further comprising:

presenting an image of at least one selectable user interface element on the flexible display; and determining if the characterization of the present flexing comprises a flexing within a specified proximity to any of the at least one selectable user interface element, and the excluded flexing comprising a flexing that is not within a specified proximity to any of the at least one selectable user interface element.

20. The method of claim 16, the method further comprising:

displaying, for a first time duration, a first set of selectable user interface elements on the flexible display, each selectable user interface element within the first set of selectable user interface elements having a respective location;

determining, during the first time duration, that the present flexing is a first display flexing, the first display flexing corresponding to a display flexing not in proximity to a respective location of any of the selectable user interface elements within the first set of selectable user interface elements;

displaying, for a second time duration subsequent to the first time duration, a second set of selectable user interface elements on the flexible display, at least one selectable user interface element within the second set of selectable user interface elements having a respective location different from a respective location of any of the selectable user interface elements within the first set of selectable user interface elements;

determining, during the second time duration, a subsequent occurrence of the first display flexing; and adding, in response to determining the occurrence of the first display flexing during the first time duration and the second time duration, the first display flexing to the at least one excluded flexing characterization.

21. The method of claim 16, the method further comprising:

detecting that the present flexing corresponds to the flexible display flexing into a stored position, the stored position defined by a display housing; and the excluded flexing comprising at least one of the flexible display flexing into a stored position and flexing out of the stored position.

22. The method of claim 21, wherein the display housing comprises a roller, and wherein the stored position comprises the flexible display being wrapped around the roller.

23. The method of claim 16, the method further comprising:

detecting that the present flexing corresponds to the flexible display flexing into a first shape, the first shape defined at least in part by a device body to which the flexible display is coupled, and the excluded flexing comprising flexing into the first shape.

24. The method of claim 23, the device body comprising an articulating frame holding the flexible display, the articulating frame comprising at least one articulation point, the excluded flexing comprising flexing associated with articulation of an articulation point within the at least one articulation point.

25. A wireless communications device, comprising:

a processor;

a memory, communicatively coupled to the processor, configured to store information operated upon by the processor;

a wireless communications component configured to provide wireless data communications between the processor and a wireless data network;

a flexible display configured to receive input from a user to indicate a selected graphical user interface element by flexing of the flexible display;

at least one flexing sensor configured to characterize a flexing of the flexible display; and a display controller, communicatively coupled to the at least one flexing sensor, the display controller configured to:

receive a characterization of a present flexing of the flexible display;

determine if the characterization of the present flexing corresponds to an excluded flexing within at least one excluded flexing characterization, each of the excluded flexing characterizations corresponding to a flexing in a particular direction and along a particular axis of flexing of the flexible display not associated with a user input;

provide, based on a determination that the present flexing does not correspond to an excluded flexing, a user selection corresponding to the present flexing that indicates a selected graphical user interface element on the flexible display; and exclude, based on a determination that the present flexing corresponds to an excluded flexing, the characterization of the present flexing from user input processing that determines user selections indicating a selected graphical user interface element on the flexible display.

26. A computer program product for receiving commands from a flexible display system, the computer program product comprising:

a non-transitory computer readable storage medium having computer readable program code embodied therewith, the computer readable program code comprising instructions for:

receiving a characterization of a present flexing of a flexible display, the present flexing indicating a selected graphical user interface element;

determining if the characterization of the present flexing corresponds to an excluded flexing within at least one excluded flexing characterization, each of the excluded flexing characterizations corresponding to a flexing in a particular direction and along a particular axis of flexing of the flexible display not associated with a user input;

provide, based on a determination that the present flexing does not correspond to an excluded flexing, a user selection corresponding to the present flexing that indicates a selected graphical user interface element on the flexible display; and excluding, based on a determination that the present flexing corresponds to an excluded flexing, the characterization of the present flexing from user input processing that determines user selections indicating a selected graphical user interface element on the flexible display.

27. The computer program product of claim 26, further comprising instructions for:

displaying, for a first time duration, a first set of selectable user interface elements on the flexible display, each selectable user interface element within the first set of selectable user interface elements having a respective location;

determining, during the first time duration, that the present flexing is a first display flexing, the first display flexing corresponding to a display flexing not in proximity to a respective location of any of the selectable user interface elements within the first set of selectable user interface elements;

displaying, for a second time duration subsequent to the first time duration, a second set of selectable user interface elements on the flexible display, at least one selectable user interface element within the second set of selectable user interface elements having a respective location different from a respective location of any of the selectable user interface element within the first set of selectable user interface elements;

determining, during the second time duration, a subsequent occurrence of the first display flexing; and adding, in response to determining the occurrence of the first display flexing during the first time duration and the second time duration, the first display flexing to the at least one excluded flexing characterization.

* * * * *